United States Patent [19]

Grasselli et al.

[11] 3,907,859
[45] Sept. 23, 1975

[54] COPRODUCTION OF ACRYLONITRILE AND ACRYLIC ACID

[75] Inventors: Robert K. Grasselli, Chagrin Falls; Dev D. Suresh, Warrensville Heights; Arthur F. Miller, Cleveland, all of Ohio

[73] Assignee: The Standard Oil Company, Cleveland, Ohio

[22] Filed: Oct. 25, 1972

[21] Appl. No.: 300,650

[52] U.S. Cl............................ 260/465.3; 260/533 N
[51] Int. Cl.² ............... C07C 120/14; C07C 57/04; C07C 51/32
[58] Field of Search...................... 260/465.3, 533 N

[56] References Cited
UNITED STATES PATENTS

| | | | |
|---|---|---|---|
| 2,904,580 | 9/1959 | Idol, Jr. | 260/465.3 |
| 3,226,422 | 12/1965 | Sennewald et al. | 260/465.3 |
| 3,365,489 | 1/1968 | Bethell et al. | 252/470 X |
| 3,641,102 | 2/1972 | Reulet et al. | 260/465.3 |
| 3,641,138 | 2/1972 | Ondrey et al. | 260/604 R |

Primary Examiner—Joseph P. Brust
Attorney, Agent, or Firm—Herbert D. Knudsen

[57] ABSTRACT

High per pass conversions to acrylonitrile and acrylic acid or methacrylonitrile and methacrylic acid and desirable commercial flexibility are realized by reacting propylene or isobutylene with molecular oxygen and about 0.1 to about 0.9 moles of ammonia per mole of olefin in the presence of two catalysts. The first catalyst is an ammoxidation catalyst, and the second catalyst is an oxidation catalyst.

6 Claims, 1 Drawing Figure

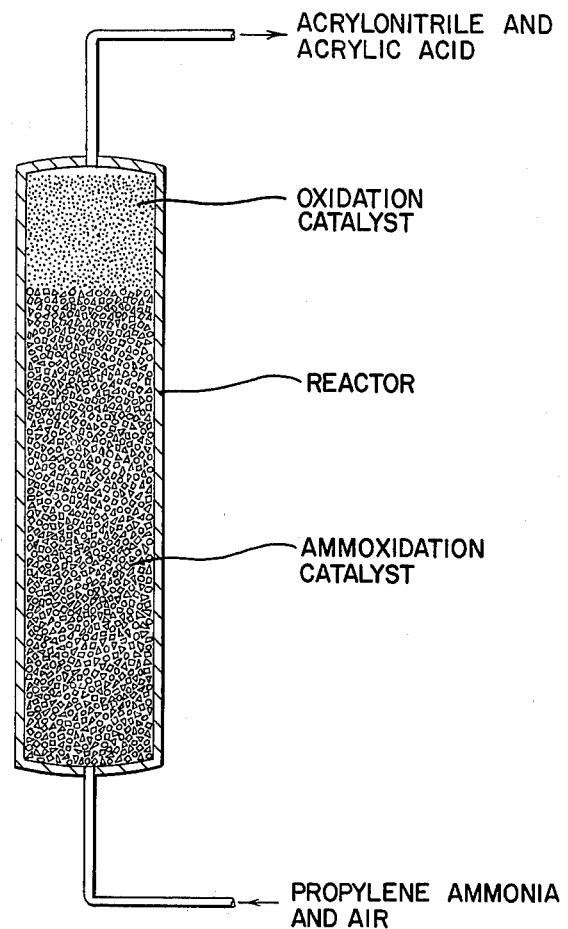

COPRODUCTION OF ACRYLONITRILE AND ACRYLIC ACID

BACKGROUND OF THE INVENTION

The catalysts employed in the present invention are known. Catalysts representative of the ammoxidation catalysts are shown by Idol in U.S. Pat. No. 2,904,580; Sennewald in U.S. Pat. No. 3,226,422; Grasselli, Miller and Hardman in U.S. Ser. No. 85,722, filed Oct. 30, 1970, and U.S. Pat. No. 3,641,102; and Canadian Patent 892,632. Catalysts representative of the oxidation catalyst of the invention are described in Ser. No. 228,375, filed Feb. 22, 1972, U.S. Pat. No. 3,641,138, U.S. Pat. No. 3,670,017, U.S. Pat. No. 3,365,489, U.S. Pat. No. 3,567,773, Belgium Patent 774,333 and Belgium Patent 775,252.

In view of the fact that these catalysts are known and the fact that ammoxidation reactions and oxidation reactions with these catalysts are known, these individual reactions and catalysts are not the point of the invention. The invention is the unique combination of these catalysts and reactions to produce a significant commercial improvement.

In a commercial plant, it is appreciated that the markets for products varies significantly. For example, a plant for the production of acrylonitrile may be run at capacity when demand for acrylonitrile is high, but when the demand decreases, only two choices are available: (1) production at full capacity can be continued; or (2) production below capacity can be maintained. Both options entail undesirable utilization of capital investments. In the first choice, storage is required, and in the second choice, the capacity of the plant is not utilized. It is an object of the present invention to minimize this waste of capital investment.

SUMMARY OF THE INVENTION

It has now been discovered according to the present invention that high per pass conversions to acrylonitrile and acrylic acid or to methacrylonitrile and methacrylic acid are obtained by reacting an olefin selected from propylene or isobutylene with about 0.5 to about 4 moles of molecular oxygen per mole of olefin and about 0.1 to about 0.9 moles of ammonia per mole of olefin at a temperature between about 300° to about 600°C. in the presence of two different catalysts, the first of which is an ammoxidation catalyst containing at least the oxides of Bi and Mo or Te and Mo and the second of which is an oxidation catalyst containing at least the oxides of V and Mo or Co and Mo. This reaction not only gives high per pass conversions to major useful products of only acrylonitrile and acrylic acid, but it also provides flexibility in the operation of the plant so that the capital investment can be utilized more profitably.

The first advantage of the process of the present invention is the high yields. Normally in oxidation reactions, any per pass conversion above 70% is considered to be superior. Surprisingly, in the present invention, per pass conversions of as high as 84.4% have been obtained, see Example 1.

The second major advantage, that of better capital utilization, is grounded on the premise that the total demand for two products will be more stable than the demand for one product alone. Thus, if there is a high demand for both products, the reaction can be run to give a product mix that will optimize profits. If the demand for one product slackens below operating capacity for that product, then more of the product in higher demand can be produced. This flexibility and most profitable utilization of the capital investment make the present invention very attractive.

The process of the present invention is geared to produce only two major products in one reactor. The relative proportion of these products is primarily dependent upon the ratio of the ammonia to the olefin used in the present invention. As the molar ratio of the ammonia is increased, the proportion of nitrile in the product is increased. As the ratio of ammonia is decreased, the proportion of acid in the product is increased. Thus, as the desire for different products changes, the product mix can be conveniently altered by adjusting the ammonia-to-olefin ratio.

The broad parameters on the ammonia-to-olefin ratio are about 0.1 to about 0.9 moles of ammonia per mole of olefin. In the preferred scope of the present invention, the ratio of the ammonia is about 0.3 to about 0.7 moles of ammonia per mole of olefin.

The catalyst used in the present invention consists of at least two different catalysts. The first catalyst is an ammoxidation catalyst containing at least the oxides of Bi and Mo, Te and Mo or mixtures thereof. The second catalyst of the invention is an oxidation catalyst containing at least the oxides of V and Mo, Co and Mo or mixtures thereof. In addition to the two required catalysts, other catalysts may be used that will advantageously affect the reaction. These catalysts could be other oxidation or ammoxidation catalysts.

Preferred ammoxidation catalysts in the present invention have the formula:

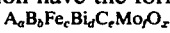

wherein

A is an alkali metal, alkaline earth metal Tl, In, rare earth metal or mixture thereof, B is Ni, Co, Mg, or a mixture thereof and C is phosphorus, arsenic, boron or antimony, and wherein $a$ and $e$ are independently 0–3, $b$ is 0 to 20, $c$ and $d$ are independently 0.1 to 10, $f$ is about 8 to about 16 and $x$ is the number of oxygens required to satisfy the valence requirements of the other elements present.

These catalysts have been found to be especially effective in the reaction of the present invention.

Preferred oxidation catalysts of the present invention are those delimited by the formula:

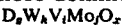

wherein D is an element selected from the group of alkali metals, alkaline earth metals, Cr, Mn, Fe, Co, Ni, Cu, Ag, Au, Zn, Cd, Hg, Sn, Pb, Sb, Bi, P, As or mixture thereof, and wherein $g$ is 0 to about 12, $h$ is 0 to about 6, $i$ is about 0.1 to about 12, $j$ is about 8 to about 16 and $x$ is the number of oxygens required to satisfy the valence requirements of the other elements present.

Most preferred are catalysts wherein $h$ is about 0.1 to about 6. These catalysts are especially effective in assuring that the acrylic acid is formed.

The catalysts used in the invention can be in the pure form or they can be mounted on a support. Numerous supports for these catalysts are known, but the most preferred support is silica.

The manner in which the catalysts are placed in the reaction may vary widely. One catalyst could be placed in one reactor and the second catalyst could be placed in a second reactor run under different conditions. In the present invention, however, the use of one undivided reaction zone is preferred.

In a fluid bed or fixed bed reactor, the first and second catalyst may be physically mixed to form an essentially homogeneous solid mixture. In the preferred practice of the present invention, the reaction is conducted in an undivided reaction zone of a fixed bed reactor wherein the two catalysts are maintained in essentially two separate zones with the ammoxidation catalyst being the catalyst which is closest to the feed of olefin, ammonia and molecular oxygen shown in the FIGURE.

The relative amount of the two catalysts may vary widely. This ratio can be altered to produce the most desirable reaction. It has been found that changing the relative amounts of the two catalysts changes the product yields of the reaction. These amounts of catalyst can be easily altered at a given ammonia feed to optimize the reaction by the reduction of undesirable by-products. In the normal practice of the invention, most of the catalyst used is the ammoxidation catalyst at ammonia feeds above about 0.4 moles of ammonia per mole of olefin. As the ammonia feed is reduced, more of the oxidation catalyst is usually required.

The reactant proportions used in the reaction except for the ammonia are essentially the same as the ammoxidation reactions shown in the art. The molecular oxygen is about 0.5 to about 4 moles per mole of olefin. Usually the molecular oxygen is added as air. Steam may also be added.

The process conditions for the reaction are substantially the same as those conditions shown for the ammoxidation reactions of the art cited. The reaction is carried out between the temperatures of about 300° and 600°C. The reaction may be run under superatmospheric, subatmospheric or atmospheric pressure. The contact time may vary widely, but contact times of less than about 20 seconds are normally employed. The other techniques of conducting this reaction are known from the ammoxidation art and are not modified substantially by the present invention.

The major advantages of the present invention are the high per pass conversions to two useful products and the better capital utilization possible by the coproduction of varying amounts of two products. This is accomplished by using a lower ratio of ammonia in an ammoxidation of propylene or isobutylene and using two different catalysts.

DESCRIPTION OF THE DRAWING

The FIGURE shows the application of the present invention to the reaction of propylene to form acrylonitrile and acrylic acid. The reactor is a fixed-bed reactor containing an ammoxidation catalyst and an oxidation catalyst in an undivided reaction zone. The reactor contains about four parts by volume of the ammoxidation catalyst and one part by volume of the oxidation catalyst. The reactor is maintained at about 350° to about 450°C.

To this reactor is charged a mixture of propylene, ammonia and air in the relative proportions by volume of about 1:0.1 to 0.9:8–12. The reactants are passed over the catalysts in the reactor, and a product of acrylonitrile and acrylic acid are obtained. The molar per pass conversion to these useful products is surprisingly high.

SPECIFIC EMBODIMENTS

Comparative Example A and Example 1

Comparison of ammoxidation reaction to reaction of invention.

A catalyst containing 82.5% $K_{0.07}Ni_{2.5}Co_{4.5}Fe_3BiP_{0.5}Mo_{12}O_{55}$ and 17.5% $SiO_2$ was prepared according to patent application Ser. No. 85,722, filed Oct. 30, 1970. Five cc. of the catalyst 20 × 35 mesh was placed in a fixed bed reactor. Using only this ammoxidation catalyst, propylene:ammonia:air:$H_2O$ in a ratio of 1:0.5:10:4 was passed over the catalyst at 400°C. and a 6-second contact time. The results of this Comparative Experiment are shown in the Table.

To show an experiment representative of the invention, the fixed bed reactor described was loaded with 4 cc. of the catalyst described for Comparative Example A in such a manner that this catalyst was closest to the inlet of the reactants as shown in the FIGURE. On top of this first catalyst, 1 cc. of a second catalyst having the formula 62% $V_3W_{1.2}Mo_{12}O_x$ and 38% $SiO_2$ was added. The reactor was run under exactly the same conditions and using the same feed. The results of this experiment are shown in the Table in comparison to the ammoxidation reaction.

The per pass conversions of the Table are stated in terms of moles and are computed as follows:

$$\text{per pass conversion} = \frac{\text{moles of acrylonitrile and acrylic acid obtain}}{\text{moles of propylene fed}}$$

TABLE

AMMOXIDATION OF PROPYLENE COMPARED TO COPRODUCTION OF ACRYLONITRILE AND ACRYLIC ACID

| Example | Catalyst | Per Pass Conversion, Mole % | | |
|---|---|---|---|---|
| | | Acrylonitrile | Acrylic Acid | Total |
| Comp. A | Ammoxidation only | 45.6 | 25.2 | 70.8 |
| 1 | Ammoxidation and Oxidation | 39.8 | 44.6 | 84.4 |

Comparative Example A also produced 9.4% acrolein. In Example 1, only a trace of acrolein was found in the effluent of the reactor using the present invention. The mixture of three products produced in Comparative Example A could not reasonably be recovered, whereas the two-component product of the invention could be easily recovered.

Example 2

Use of different proportions of the two catalysts

Using the reactor, catalysts, conditions and reactant feed of Example 1, the relative proportion of the two catalysts was altered. The reactor was charged with 2.5 cc. of the ammoxidation catalyst and 2.5 cc. of the oxidation catalyst in such a manner that the reactants contacted the ammoxidation catalyst first. The mole per pass conversion to acrylonitrile was 36.2% and the per pass conversion to acrylic acid was 44.4% for a total per pass conversion of 80.5%. Only a trace of acrolein was observed.

Example 3

Mixed catalysts

In the same manner as shown in Example 1, the reaction to produce acrylonitrile and acrylic acid was conducted except that rather than placing the ammoxidation catalyst in one zone and the oxidation catalyst in a second zone the two catalysts were physically mixed by shaking the catalysts together in a closed container. A substantially homogeneous physical mixture was obtained. The reaction was conducted using the feed and conditions of Example 1. The per pass conversion was 28.8% to acrylonitrile and 49.5% to acrylic acid for a total per pass conversion to the two desired products of 78.3%. Only a trace of acrolein was observed.

In the same manner as shown by the examples above, other oxides ammoxidation catalysts in the art, containing elements such as BiPMo, CeTeMo and FeBiPMo, could be used as the ammoxidation catalyst, and desirable high per pass conversions are obtained.

Also in the same manner as shown above, other oxide oxidation catalysts shown in the art containing elements such as VMo, CoMo and SnSbVMoW, would be substituted for the oxidation catalyst of the examples, and desirable per pass conversions are obtained. The two catalysts could also be placed in two consecutive reactors run under different conditions, or the two catalysts could be physically mixed in a fluid bed reactor to obtain a desirable reaction.

In the same manner as shown for propylene, isobutylene could be reacted to give a useful product consisting of methacrylonitrile and methacrylic acid.

We claim:

1. The process for preparing acrylonitrile and acrylic acid or methacrylonitrile and methacrylic acid comprising reacting an olefin selected from propylene or isobutylene, about 0.5 to about 4 moles of molecular oxygen per mole of olefin and about 0.1 to about 0.9 moles of ammonia per mole of olefin at a temperature between about 300° to about 600°C in the presence of at least two different catalysts, the first of which is an ammoxidation catalyst consisting essentially of a catalyst of the formula:

$$A_aB_bFe_cBi_dC_eMo_fO_x$$

wherein
  A is an alkali metal, alkaline earth metal, Tl, In, rare earth metal or mixture thereof,
  B is Ni, Co, Mg or a mixture thereof and
  C is phosphorus, arsenic, boron or antimony,
and wherein
  $a$ and $e$ are independently 0–3,
  $b$ is 0 to 20,
  $c$ and $d$ are independently 0.1 to 10,
  $f$ is about 8 to about 16 and
  $x$ is the number of oxygens required to satisfy the valence requirements of the other elements present.

and the second of which is an oxidation catalyst consisting essentially of a catalyst of the formula:

$$D_gW_hV_iMo_jO_x$$

wherein
  D is an element selected from the group of alkali metals, alkaline earth metals, Cr, Mn, Fe, Co, Ni, Cu, Ag, Au, Zn, Cd, Hg, Sn, Pb, Sb, Bi, P, As or mixture thereof,
and wherein
  $g$ is 0 to about 12,
  $h$ is 0.1 to about 6,
  $i$ is 0.1 to about 12,
  $j$ is about 8 to about 16 and
  $x$ is the number of oxygens required to satisfy the valence requirements of the other elements present.

2. The process of claim 1 wherein the molar ratio of ammonia to olefin is about 0.3 to about 0.7.

3. The process of claim 1 wherein the reaction is run in an undivided reaction zone.

4. The process of claim 3 wherein the reaction is run in an undivided reaction zone of a fixed bed reactor, and the two catalysts are maintained in essentially two separate zones with said ammoxidation catalyst being the catalyst which first contacts the olefin, ammonia and molecular oxygen.

5. The process of claim 1 wherein propylene is reacted to obtain a product of acrylonitrile and acrylic acid.

6. The process of claim 1 wherein water or steam is added to the reaction.

* * * * *